United States Patent
Mansfield et al.

(10) Patent No.: US 12,399,784 B1
(45) Date of Patent: Aug. 26, 2025

(54) EFFICIENT EVENT-DRIVEN MEMORY SNAPSHOTS IN EMBEDDED SYSTEMS

(71) Applicant: Hewlett Packard Enterprise Development LP, Spring, TX (US)

(72) Inventors: Ryan M. Mansfield, Lincoln, CA (US); Pedro Joaquin Cuadra Chamorro, Puntarenas (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/590,142

(22) Filed: Feb. 28, 2024

(51) Int. Cl.
G06F 11/14 (2006.01)

(52) U.S. Cl.
CPC ...... *G06F 11/1464* (2013.01); *G06F 11/1458* (2013.01); *G06F 11/1461* (2013.01)

(58) Field of Classification Search
CPC ............ G06F 11/1464; G06F 11/1458; G06F 11/1461; G06F 11/1456; G06F 11/1451
USPC ................................................. 711/162, 161
See application file for complete search history.

(56) References Cited

U.S. PATENT DOCUMENTS

| | | | |
|---|---|---|---|
| 2006/0168471 A1* | 7/2006 | Schulstad | G06F 11/0778 714/6.11 |
| 2015/0066859 A1* | 3/2015 | Blake | G06F 11/1438 707/649 |

* cited by examiner

*Primary Examiner* — Hosain T Alam
*Assistant Examiner* — Zubair Ahmed
(74) *Attorney, Agent, or Firm* — Yao Legal Services, Inc.

(57) ABSTRACT

An embedded system in a host computer is provided. During operation, the embedded system can detect an event in the embedded system. Here, the event can trigger the generation of a memory snapshot of the embedded system. The embedded system can then determine a set of memory segments of a memory in the embedded system for inclusion in the memory snapshot. Subsequently, the embedded system can insert a set of descriptors corresponding to the set of memory segments into the memory. Here, a respective descriptor indicates a memory segment associated with a core dump from the embedded system. The embedded system can send a notification to the host computer to generate the memory snapshot comprising the set of memory segments based on the set of descriptors.

20 Claims, 8 Drawing Sheets

EFFICIENT EVENT-DRIVEN MEMORY SNAPSHOTS IN EMBEDDED SYSTEMS

BACKGROUND

A host computing system can be equipped with one or more embedded systems that can facilitate specialized services. Such an embedded system can be referred to as a system-on-chip or SOC. Typically, the embedded system can be equipped with one or more processing units and a memory device and may deploy its own operating system.

BRIEF DESCRIPTION OF THE FIGURES

In the figures, like reference numerals refer to the same figure elements.

DETAILED DESCRIPTION

Figure 1A:
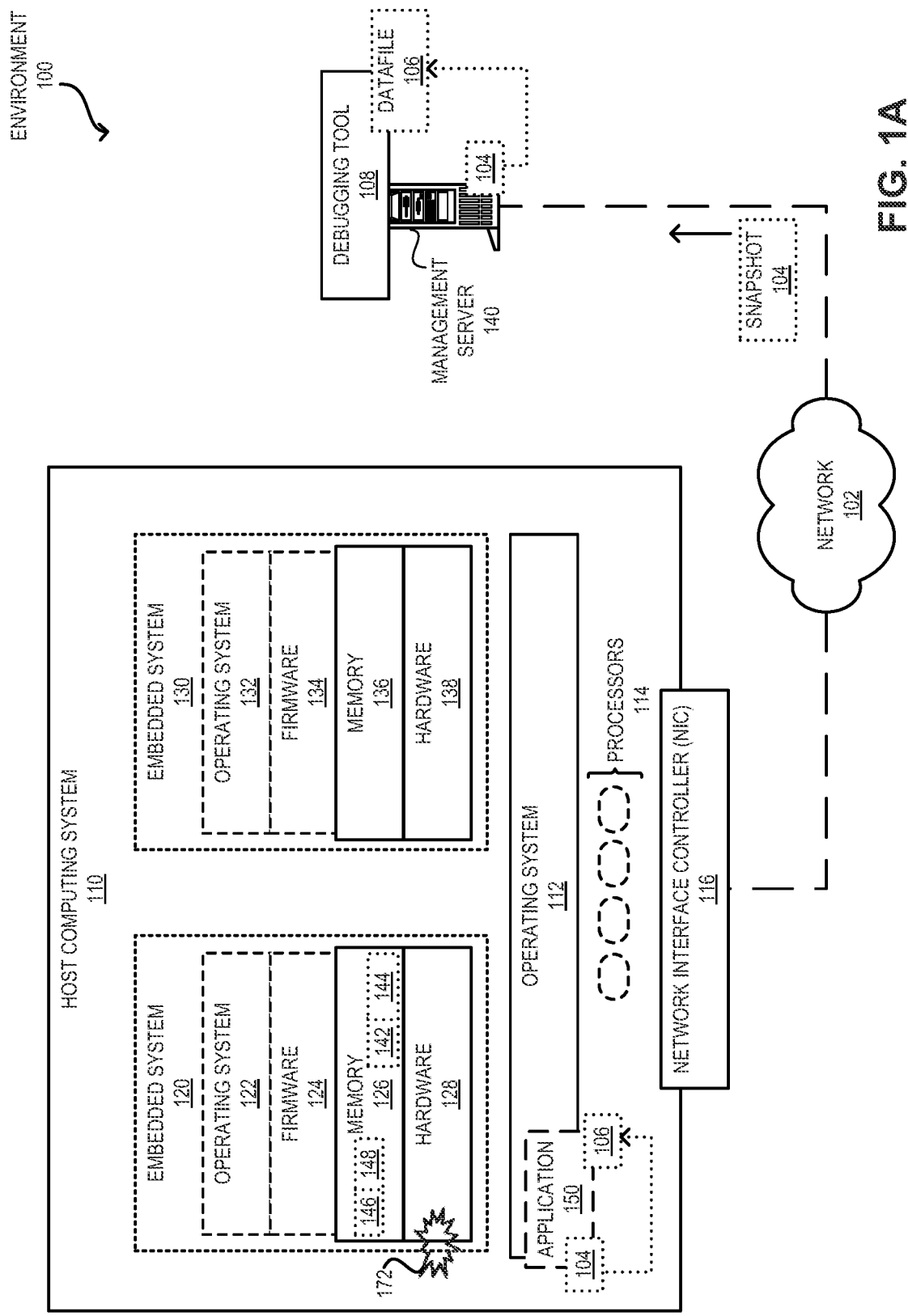
FIG. 1A illustrates an example of an embedded system facilitating event-driven memory snapshots, in accordance with an aspect of the present application.

An embedded system can be a computing device designed to perform a specialized and dedicated operation (or function). Typically, the embedded system can be deployed in a host computing system (or host computer). The embedded systems are often designed as SOCs. The hardware components of the embedded system can include one or more processors and memory (e.g., one or more random-access memory modules) and can be implemented in microcontrollers, digital signal processors (DSP), application-specific integrated circuits (ASIC), and field-programmable gate arrays (FPGA). The embedded system can run a streamlined and compact operating system, which can be distinct from the operating system of the host computing system.

Because the computing resources on the embedded system can be limited, an event, such as a failure or an exception in the embedded system can typically be examined based on off-chip debugging. For example, a failure can be an event that terminates the operations of the embedded system, such as a memory fault. On the other hand, an exception may handle an error within the execution of an operation on the embedded system, such as an execution error. Log files and failure information, such as event records (e.g., a path of execution of the embedded system at the time of the event), can be retrieved from the embedded system and analyzed outside of the embedded system. The analysis can indicate which software and hardware elements of the embedded system are responsible for the event and can be used to reduce future undesired events.

The aspects described herein address the problem of efficiently facilitating a memory snapshot corresponding to an event in an embedded system by (i) identifying the segments associated with the event in the memory of the embedded system; and (ii) placing corresponding descriptors with the identified memory segments. The firmware of the embedded system may identify the memory segments and place the descriptors accordingly. The embedded system can notify the host computing system (e.g., using an interrupt) about the event. The host computing system can then retrieve the memory segments based on the descriptors and generate a memory snapshot. The memory snapshot can also be referred to as a memory dump and can incorporate a core dump associated with the event.

With existing technologies, the embedded system can run a streamlined (or limited) operating system that may not facilitate a memory snapshot, especially during a trigger event (e.g., a failure). Furthermore, the embedded system may not be equipped with a persistent storage device. Therefore, in response to the event, the embedded system may not be able to retain the state information of its memory. In addition, even if the operating system is capable of recording a memory snapshot, the operating system may only record the processor states since the operating system executes on the processor. However, the event may be caused by a hardware module, such as the direct memory access (DMA) engine or the register controller. Consequently, the memory snapshot may not indicate the states associated with the hardware module causing the event. Hence, determining the cause of an event in an embedded system can be challenging.

To address this issue, upon detecting the event (e.g., a failure), the embedded system can determine the memory segments associated with the event. In some examples, the firmware of the embedded system may identify the memory segments associated with the event. The embedded system may detect an event when the execution of the operation of the embedded system is interrupted. These memory segments can be a set of predetermined memory segments of the memory or a set of event-specific memory segments. For example, the embedded system may determine a predetermined set of hardware and software components critical for the embedded system and select the memory segments storing information associated with these components. On the other hand, to select the event-specific memory segments, the embedded system may dynamically determine an event path associated with the event. The event path can indicate the execution of operations associated with the event on hardware components of the embedded system. For example, if operations of the embedded system include direct memory access, the DMA controller in conjunction with the register manager can facilitate memory access via a set of registers. Therefore, the event path can include the DMA controller, the register manager, and the registers. Accordingly, if the event path is the crash path of a failure, it can include the sequence of instructions executed on corresponding hardware components of the embedded system in association with the occurrence of the event. Therefore, the event path can indicate a respective hardware component of the embedded system involved in the event.

The embedded system can then place respective descriptors in the memory of the embedded system based on the event. In other words, the descriptors are placed with the memory segments associated with the event, such as memory segments storing states associated with the event path. A respective descriptor can indicate the memory address and size of the corresponding memory segment. The embedded system can notify the host computing system (e.g., using an interrupt) about the event. The host computing system can then retrieve the memory segments indicated by the descriptors to generate a corresponding memory snapshot. For example, an application or a driver running on the host computing system can read a respective memory segment from the address indicated by the corresponding descriptor and incorporate it into the memory snapshot.

The memory snapshot can then be used to analyze the event. For example, the memory snapshot can be provided to a debugging tool that can present the information from the memory snapshot to an administrator. The debugging tool can be selected by the administrator from a list of supported debugging tools. Based on the selection, the memory snapshot can be represented in a format supported by the debugging tool. For example, if the debugging tool is the GNU Project Debugger (GDB) tool, the reformatted memory snapshot can be represented by Executable and Linkable Format (ELF) headers. The reformatting of the memory snapshot can be performed on the host computing system or on another device (e.g., via a network). In this way, the embedded system can efficiently facilitate a memory snapshot that can be used for analyzing an event, such as a failure or an exception.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of an embedded system facilitating event-driven memory snapshots, in accordance with an aspect of the present application. A computing environment can include a computing system 110 comprising a set of processors 114. An operating system 112 can execute on processors 114. Computing system 110 can include a network interface controller (NIC) 116 coupled to a network 102. Computing system 110 can send and receive packets via NIC 116. Computing system 110 can include a plurality of embedded systems 120 and 130. Therefore, computing system 110 can be the host computing system for embedded systems 120 and 130.

Embedded systems 120 and 130 can be computing devices designed to perform respective specialized and dedicated operations (or functions). For example, if host computing system 110 is the central computing unit of a car, embedded system 120 or 130 can be any of: anti-lock braking system (ABS), electronic stability control (ESC), adaptive cruise control system, airbag control unit, rain-sensing system, automated headlight control system, etc. Unlike an accelerator, such as a GPU or a tensor processing unit (TPU), in a computing system, an embedded system can run a separate operating system on its own processing units and memory.

Embedded systems 120 and 130 can run streamlined and compact operating systems 122 and 132, respectively. Operating systems 122 and 132 can be specialized and streamlined operating systems that can execute on embedded systems 120 and 130, respectively, and facilitate corresponding operations. Furthermore, operating systems 122 and 132 can be distinct from operating system 112 of computing system 110. Embedded system 120 can be equipped with a memory 126 and hardware 128. Memory 126 can include volatile memory, non-volatile memory, or a combination thereof. Hardware 128 can include one or more processing units (e.g., processors and accelerators) and hardware components (e.g., sensors, imaging devices, memory-access modules, etc.) needed to support the operations of embedded system 120.

Hardware components in hardware 128 can include, but are not limited to, microcontrollers, DSPs, ASIC, FPGA, and gate arrays. Firmware 124 can operate as an intermediary between operating system 122 and hardware 128 in embedded system 120. Therefore, how hardware 128 facilitates the operation of embedded system 120 can be controlled by firmware 124. Typically, firmware 124 can execute from memory 126. Similarly, embedded system 130 can be equipped with a memory 136 and hardware 138. Firmware 134 can operate as an intermediary between operating system 132 and hardware 138 in embedded system 130.

Because the computing resources on embedded systems 120 and 130 can be limited, a trigger event on embedded system 120 or 130 can typically be examined based on off-chip debugging. Examples of such an event can include, but are not limited to, a failure or an exception (e.g., an execution error or a memory fault), a planned unavailability (e.g., an upgrade to firmware 124 or 134), initiation of a debugging session, a power cycle, and a user command. Suppose that embedded system 120 incurs an event 172. As a response, a core dump comprising log files and failure information, such as event records (e.g., a path of execution of embedded system 120 at the time of event 172), can be retrieved from memory 126 and analyzed outside of embedded system 120. The core dump can include states (e.g., register values, stack information, flags, etc.) associated with embedded system 120 stored in memory 126 at the time of event 172. The analysis can indicate which software and hardware elements of embedded system 120 are responsible for event 172.

Because operating system 122 can be streamlined with specialized operations associated with embedded system 120, operating system 122 may not support the generation of a memory snapshot. Furthermore, due to event 172, embedded system 120 may not be capable of generating the snapshot. In addition, embedded system 120 may not be equipped with a persistent storage device. Therefore, in response to event 172, embedded system 120 may not be able to retain the state information of memory 126. In the same way, operating system 132 may not support the generation of a memory snapshot, and embedded system 130 may not be able to retain the state information of memory 136.

In addition, even if operating system 122 is capable of recording a memory snapshot, operating system 122 may only record the processor states since operating system 122 executes on the processor. However, event 172 may be caused by a hardware component, such as the DMA engine or the register controller in hardware 128. Consequently, a snapshot of memory 126 generated by operating system 122 may not indicate the states of the DMA engine or the register controller associated with event 172. In the same way, a snapshot of memory 136 generated by operating system 132 may not indicate the states associated with an event in embedded system 130. Hence, determining the cause of such events in embedded systems 120 and 130 can be challenging.

To address this issue, embedded system 120 can detect an event. The occurrence of the event can be indicated in a register (e.g., in hardware 128) of embedded system 120. In some example, firmware 124 may detect the exception based on the value of the register. Upon detecting event 172, embedded system 120 can determine the memory segments associated with event 172. These memory segments can be a set of predetermined memory segments or the memory or a set of event-specific memory segments. For example, embedded system 120 may determine a predetermined set of components critical for embedded system 120 and select the memory segments storing state information of these components.

On the other hand, to select the event-specific memory segments, embedded system 120 may dynamically determine an event path associated with event 172. The event path can indicate the hardware components of hardware 128 in association with the occurrence of event 172. A subset of the hardware components may execute a set of instructions (e.g., from operating system 122 or an application running on it). Therefore, the event path can indicate embedded system 120's hardware and software components associated with event 172.

Embedded system 120 can then place respective descriptors with the memory segments associated with event 172 in memory 126. For example, embedded system 120 may determine that memory segments 144 and 148 are associated with event 172 because memory segments 144 and 148 store the states associated with event 172. Therefore, memory segments 144 and 148 can be associated with the core dump (or memory dump) from embedded system 120 corresponding to event 172. Accordingly, embedded system 120 can then place descriptors 142 and 146 with memory segments 144 and 148, respectively. Descriptor 142 can indicate the memory address and size of memory segment 144, and descriptor 146 can indicate the memory address and size of memory segment 148. Embedded system 120 can notify computing system 110 (e.g., using an interrupt) about event 172.

Computing system 110 can parse memory 126 and detect descriptors 142 and 146 in memory 126. Computing system 110 can then retrieve memory segments 144 and 148 indicated by descriptors 142 and 146, respectively. Computing system 110 can then generate a memory snapshot 104 comprising memory segments 144 and 148. For example, a snapshot management application 150 (e.g., an application running on operating system 112 or a driver associated with embedded system 120) can read memory segments 144 and 148 from the addresses indicated by descriptors 142 and 146, respectively and incorporate them into memory snapshot 104. For each of memory segments 144 and 148, memory snapshot 104 may also indicate the type and length of the content of the corresponding memory segment. Since memory snapshot 104 may include the states associated with event 172, memory snapshot 104 can represent a compact core dump from embedded system 120.

Memory snapshot 104 can then be used to analyze event 172. For example, memory snapshot 104 can be converted to a datafile 106 that can be recognizable and presentable by a debugging tool 108. Computing system 110 may send memory snapshot 104 using NIC 116 via network 102 to a management server 140 used for offsite debugging. A management server 140 can then reformat memory snapshot 104 to generate datafile 106. Application 150 may also be capable of reformatting memory snapshot 104 to generate datafile 106. Debugging tool 108 can present the information from datafile 106 to an administrator.

Debugging tool 108 can be selected by the administrator from a list of debugging tools facilitated by management server 140. For example, if debugging tool 108 is a GDB tool, datafile 106, which is the reformatted memory snapshot 104, can be represented by a set of ELF headers. Embedded system 120 can thus facilitate the efficient generation of memory snapshot 104 that can be used for analyzing event 172. In the same way embedded system 130 may facilitate the efficient generation of a memory snapshot associated with an event in embedded system 130.

Figure 1B:
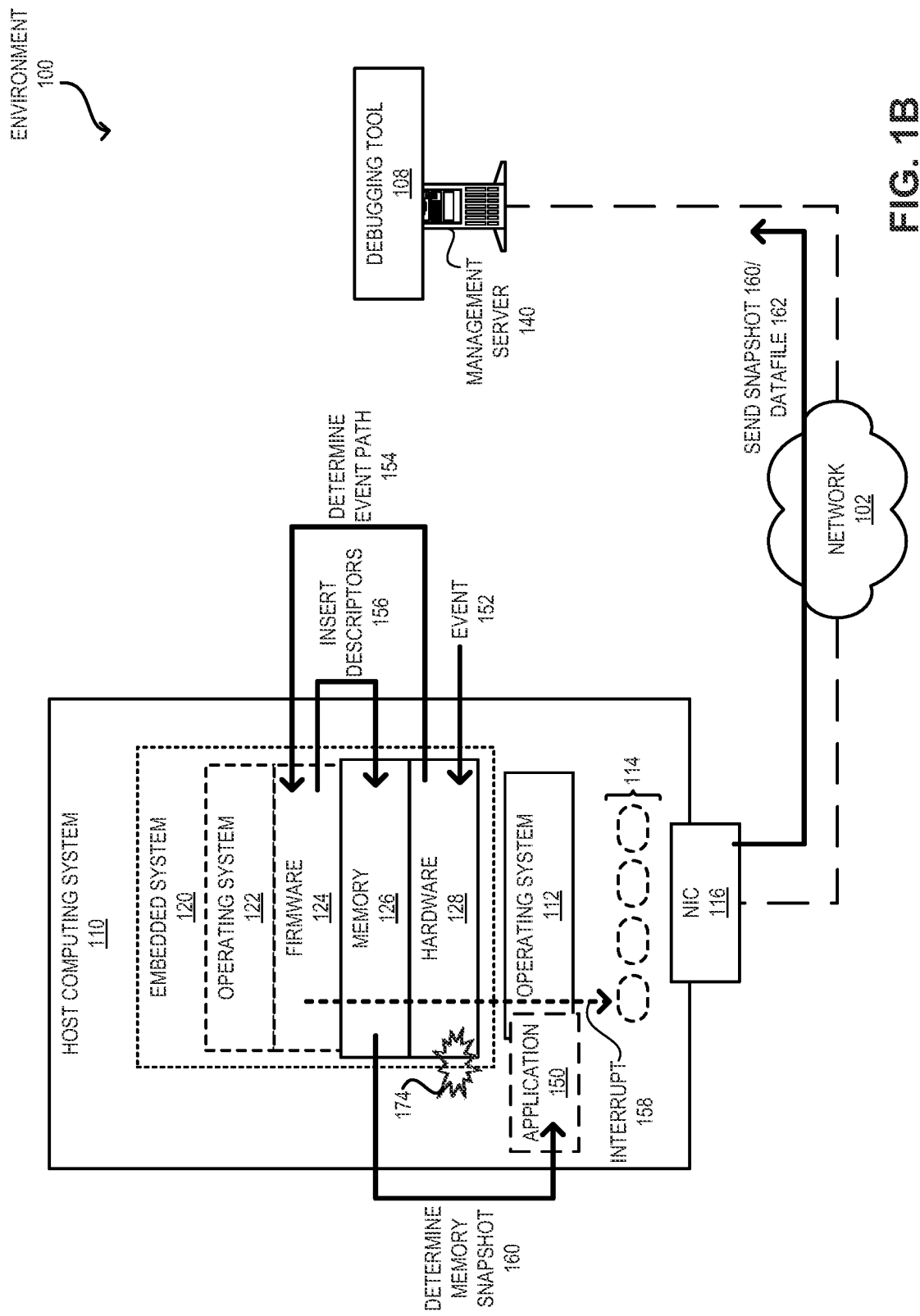
FIG. 1B illustrates an example of a sequence of operations associated with an embedded system facilitating event-driven memory snapshots, in accordance with an aspect of the present application.

FIG. 1B illustrates an example of a sequence of operations associated with an embedded system facilitating event-driven memory snapshots, in accordance with an aspect of the present application. During operation, an event 152 can occur in embedded system 120. Event 152 can be an exception or error caused during the execution of a piece of software running on embedded system 120 or a fault caused by one or more components in hardware 128. Embedded system 120 can detect event 152 and determine an event path 154. Event path 154 can indicate the hardware components executing the operations. Event path 154 can also indicate memory blocks or segments storing information associated with software elements running at the time of event 152. These memory segments can include software stacks, page tables, task control blocks (TCBs), etc.

Upon detecting event path 154, embedded system 120 can insert corresponding descriptors 156 into memory 126. A respective descriptor can indicate the address (e.g., the beginning address) of a corresponding memory segment and the size of the memory segment. As a result, the descriptor can indicate which portion of memory 126 includes information associated with event 152. Upon placing descriptors 156, embedded system 120 can issue an interrupt 158 to at least one processor in processors 114. Interrupt 158 can correspond to the event. For example, if the event is an exception incurred during the execution of an application on embedded system 120, interrupt 158 can indicate the exception and may store a corresponding exception code in a register on the processor. In this way, event 152 can trigger the generation of memory snapshot 260 facilitated by embedded system 120.

Based on interrupt 158, computing system 110 can discover the event. Computing system 110 can detect event 172 from embedded system 120 (e.g., at operating system 112 via an application programming interface (API)). Computing system 110 can then parse memory 126 and discover descriptors 156 in memory 126. When computing system 110 detects a memory segment indicated by a descriptor, computing system 110 can retrieve the memory segment. Upon retrieving all memory segments indicated by descriptors 156, computing system 110 can determine a memory snapshot 160 comprising the retrieved memory segments. For a respective memory segment, memory snapshot 160 may also indicate the type and length of the content of the corresponding memory segment.

Computing system 110 may also convert memory snapshot 160 into a datafile 162, which can be in a format recognized by debugging tool 108. For example, if debugging tool 108 is a GDB tool, datafile 162 can be represented by a set of ELF headers. Computing system 110 may send memory snapshot 160 (and datafile 162) using NIC 116 via network 102 to management server 140. Debugging tool 108 may run on management server 140. Converting memory snapshot 160 to datafile 162 can allow debugging tool 108 to present the states in the memory segments to an administrator.

Figure 2:
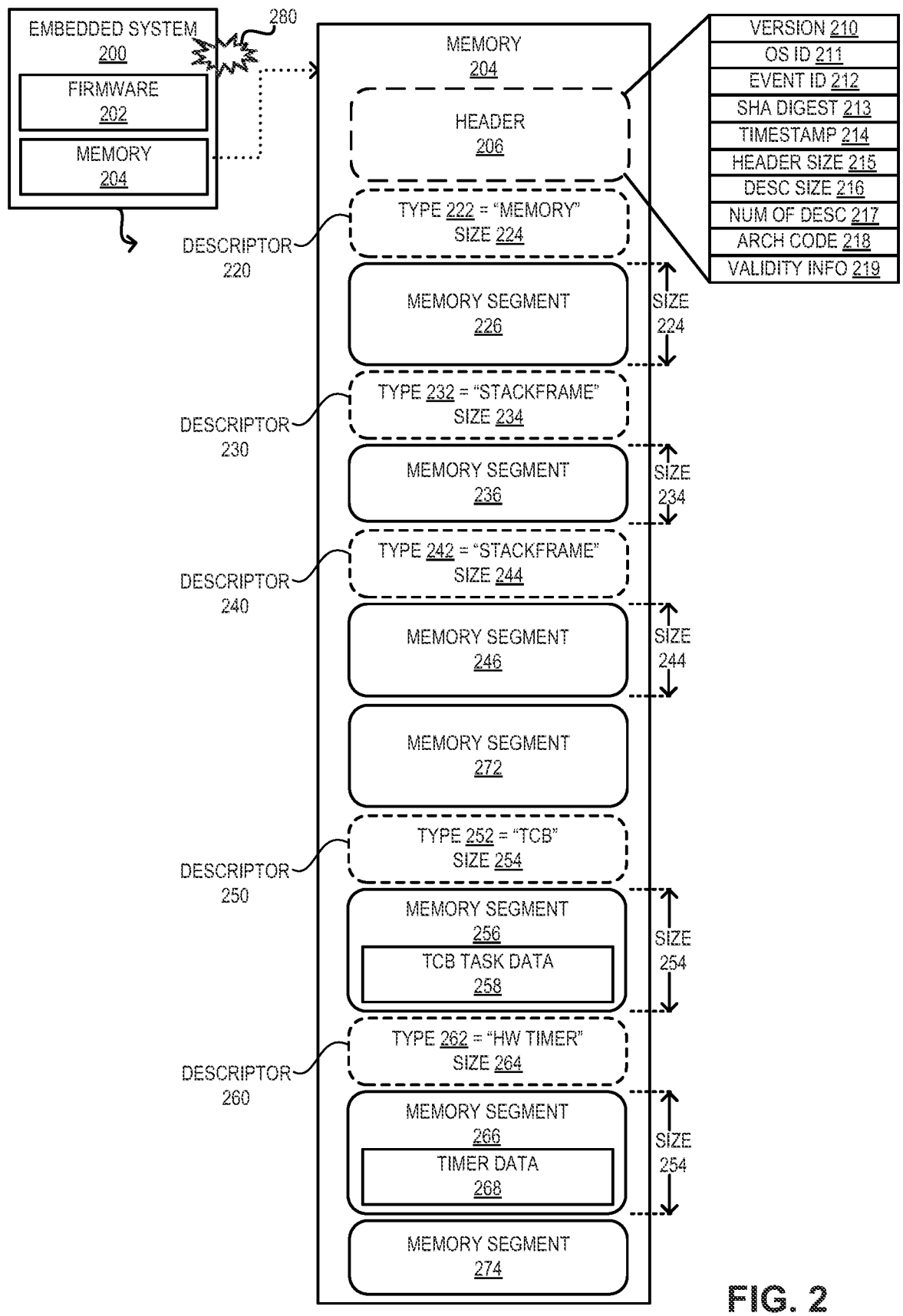
FIG. 2 illustrates an example of descriptor placement in the memory of an embedded system, in accordance with an aspect of the present application.

FIG. 2 illustrates an example of descriptor placement in the memory of an embedded system, in accordance with an aspect of the present application. An embedded system 200 can include a firmware 202 and a memory 204. When embedded system 200 detects an event 280, such as a failure or exception, embedded system 200 can determine a set of memory segments associated with event 280 in memory 204. The set of memory segments can include memory segments 226, 236, 246, 256, and 266. These memory segments can be a set of predetermined memory segments (e.g., associated with a predetermined set of components of embedded system 200) that typically store critical state information of embedded system 200. These memory segments can also be a set of memory segments storing state information indicating an event path of event 280.

To allow the host computing system of embedded system 200 to generate a memory snapshot, embedded system 200 can include a descriptor with a respective memory segment associated with event 280. In some examples, firmware 202 may place the descriptors in memory 204. Embedded system 200 can also include a descriptor header 206 in memory 204. Header 206 can indicate information associated with embedded system 200 and individual descriptors. The information included in header 206 can comprise one or more of: a version number 210 of firmware 202, an operating system identifier 211 of embedded system 200, an event identifier 212 identifying event 280, a hash digest 213 (e.g., determined based on a secure hashing algorithm (SHA)) of the determined memory segments, a timestamp 214 of the event 280, a size 215 of descriptor header 206, a size 216 of a respective descriptor, a number of descriptors 217 placed in memory 204, an architecture code 218 associated with embedded system 200, and validity information 219 of descriptor header 206. For example, validity information 219 can include redundancy check information determined based on memory segments 226, 236, 246, 256, and 266.

In addition, embedded system 200 can include descriptors 220, 230, 240, 250, and 260 with memory segments 226, 236, 246, 256, and 266, respectively. Each descriptor can include a type and a size of the corresponding memory segment. In this example, descriptor 220 can include a type 222 and a size 224 of memory segment 226. If memory segment 226 includes a portion of the memory accessed (e.g., by an application running on embedded system 200) during event 280, type 222 can indicate "memory." Size 224 can then indicate the number of memory units (e.g., bits, bytes, or words) in memory segment 226. Therefore, to retrieve memory segment 226, the host computing system can start reading from the memory address subsequent to descriptor 220 and read the number of memory units indicated by size 225.

Descriptor 230 can include a type 232 and a size 234 of memory segment 236. Similarly, descriptor 240 can include a type 242 and a size 244 of memory segment 246. If memory segments 236 and 246 include respective stacks being accessed in association with event 280, types 232 and 242 can indicate a "stackframe." If the stack is associated with a function call, the corresponding memory segment can include the function call and the corresponding arguments. Furthermore, descriptor 250 can include a type 252 and a size 254 of memory segment 256. If memory segment 256 includes TCB task data 258 indicating the states of the task being executed in association with event 280, type 252 can indicate a "TCB."

In addition, descriptor 260 can include a type 262 and a size 264 of memory segment 266. If memory segment 266 includes timer data 268 indicating the states and values of the timers maintained at the hardware of embedded system 200, type 262 can indicate a "HW timer" (i.e., hardware timer). It should be noted that memory 204 can include memory segments 272 and 274 that may not be associated with event 208. Therefore, embedded system 200 may place descriptors with memory segments 272 and 274. Consequently, the host computing system may not read memory segments 272 and 274 when embedded system 200 notifies the host computing system. In this way, event 280 can trigger the generation of a memory snapshot facilitated by embedded system 200.

Figure 3A:
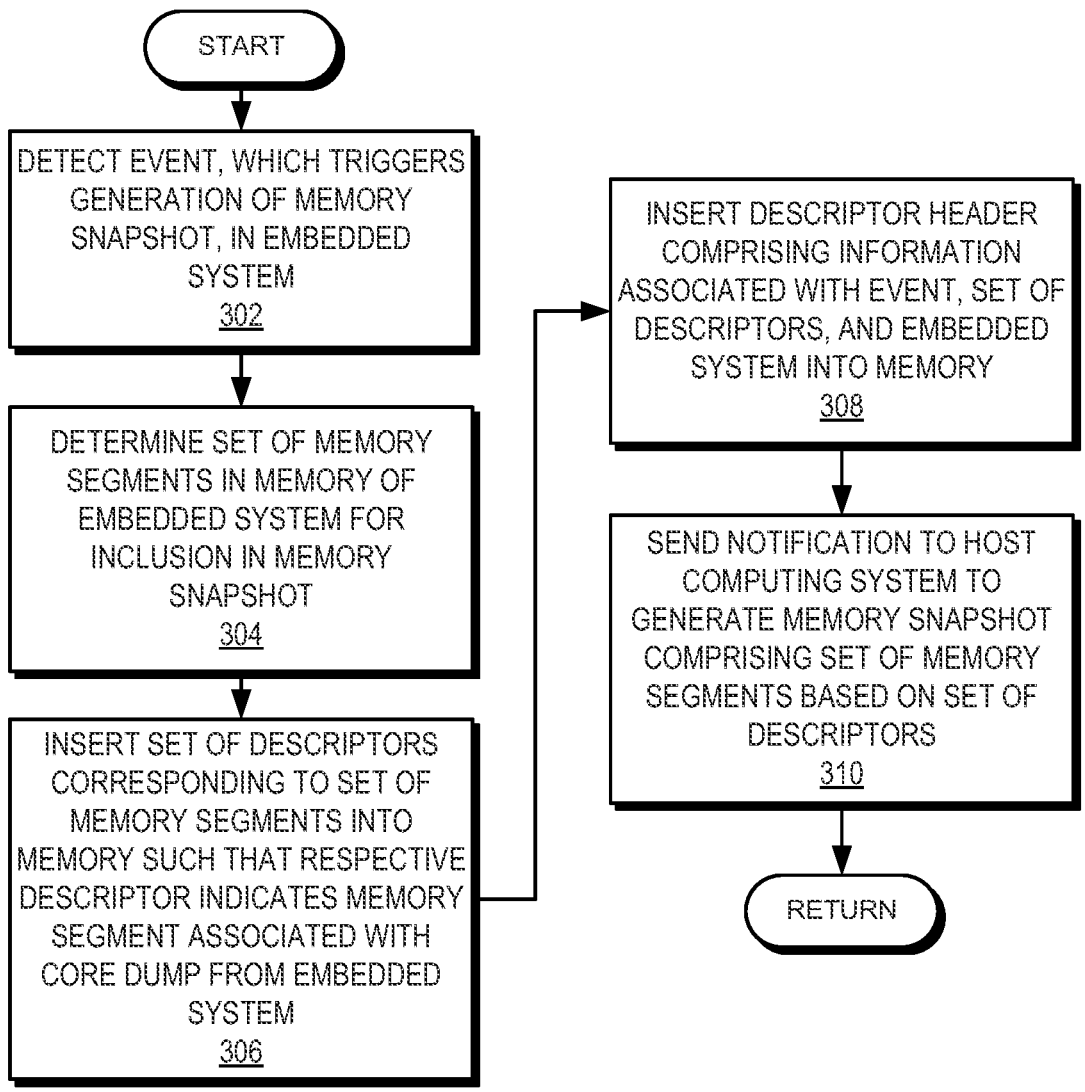
FIG. 3A presents a flowchart illustrating the process of an embedded system of a host computing system facilitating event-driven memory snapshots, in accordance with an aspect of the present application.

FIG. 3A presents a flowchart illustrating the process of an embedded system of a host computing system facilitating event-driven memory snapshots, in accordance with an aspect of the present application. During operation, the embedded system can detect an event, which triggers the generation of a memory snapshot, in the embedded system (operation 302). The event can be a failure or an exception. The embedded system may detect an event when the execution of the operation of the embedded system is interrupted. The interruption (e.g., a buffer running out of memory) can place a predetermined value in a register of the embedded system. Accordingly, the embedded system can detect occurrence of the event based on the value of the register. In some examples, the firmware of the embedded system may detect the event based on the value of the register. Here, the event can trigger the generation of a memory snapshot of the embedded system. For example, if the event is a failure, a core dump comprising states of hardware and software components in the memory of the embedded system can be incorporated into the memory snapshot. Consequently, the generation of the memory snapshot can be helpful for analyzing the event.

The embedded system can determine a set of memory segments in the memory of the embedded system for inclusion in the memory snapshot (operation 304). The memory segments can store state information associated with the event. For example, these memory segments can store a core dump associated with the event from the embedded system. The core dump can include the memory content, stacks, TCBs, hardware timers, etc., that are associated with the event. The embedded system can then insert a set of descriptors corresponding to the set of memory segments into the memory such that a respective descriptor indicates a memory segment associated with the core dump from the embedded system (operation 306). Each such descriptor can indicate the size and type associated with the corresponding memory segment.

The embedded system can also insert a descriptor header comprising information associated with the event, the set of descriptors, and the embedded system into the memory (operation 308). For example, the descriptor header can include a version number of the firmware, an operating system identifier, an event identifier, a hash digest, a timestamp, the size of the descriptor header, the size of a respective descriptor, the number of descriptors placed in the memory, an architecture code, and validity information. The descriptor header can be placed at a predetermined location in the memory (e.g., in the lower addresses) of the embedded system so that the host computing system can be aware of the location of the descriptor header. Furthermore, the fields and respective lengths of the fields of the descriptor header can be predefined.

The embedded system can then send a notification to the host computing system (e.g., an interrupt issued to a processor of the host computing system) to generate the memory snapshot comprising the set of memory segments based on the set of descriptors (operation 310). Consequently, the host computing system can read the descriptor header, and the host computing system can determine the nature of the event and the size and number of the descriptors. Accordingly, the host computing system can retrieve a respective memory segment indicated by a corresponding descriptor and generate the memory snapshot comprising the set of memory segments.

Figure 3B:
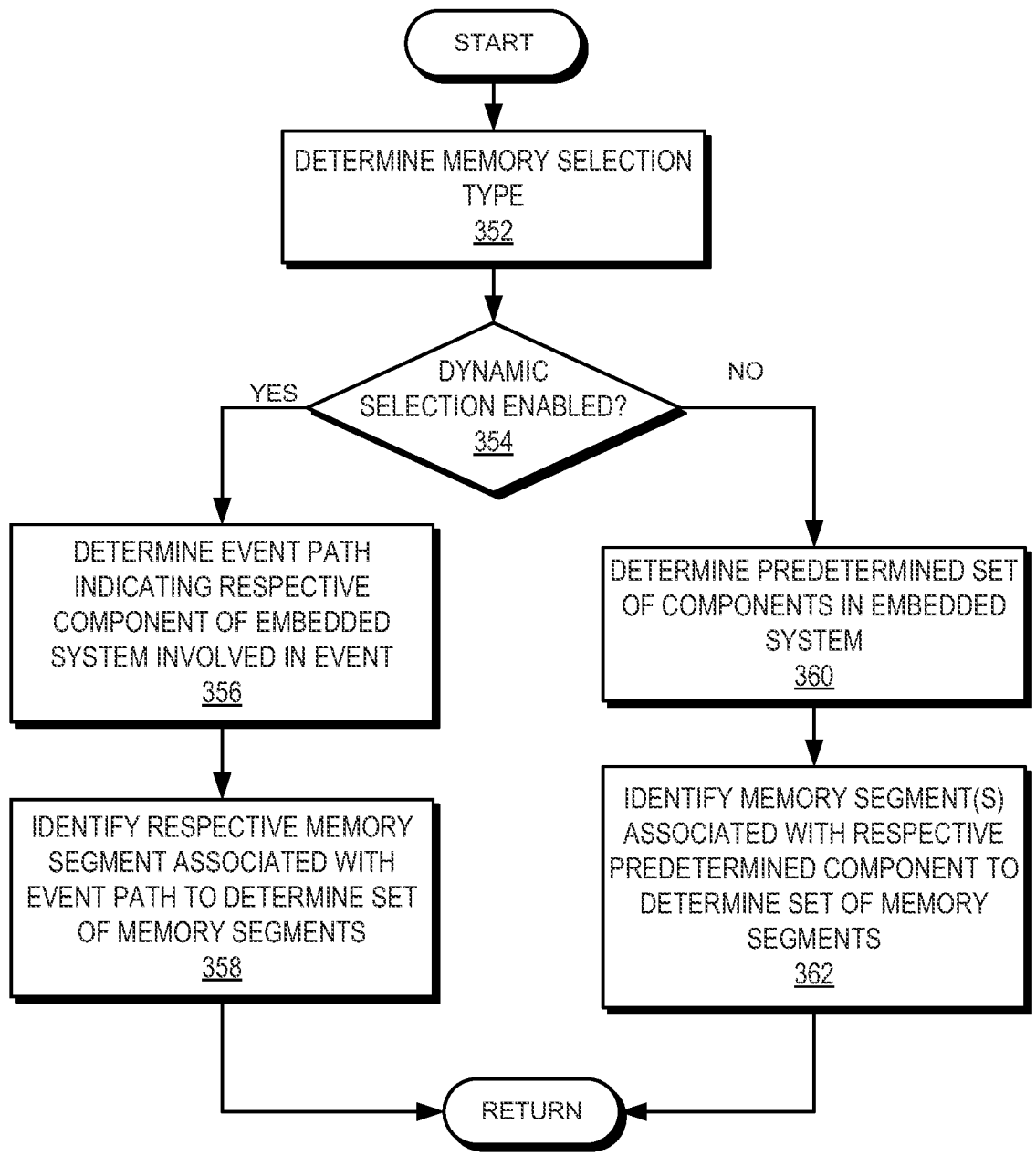
FIG. 3B presents a flowchart illustrating the process of an embedded system selecting memory segments for facilitating event-driven memory snapshots, in accordance with an aspect of the present application.

FIG. 3B presents a flowchart illustrating the process of an embedded system selecting memory segments for facilitating event-driven memory snapshots, in accordance with an aspect of the present application. During operation, the embedded system can determine a memory selection type for the embedded system (operation 352). The memory selection type can be preconfigured for the embedded system and indicate what type of memory selection supported by the embedded system. Therefore, the memory selection type can indicate whether the embedded system can dynamically select the set of memory segments associated with an event based on a corresponding event path. Accordingly, the embedded system can determine whether the dynamic selection is enabled for the embedded system (operation 354). The enablement of the dynamic selection can indicate whether the memory segments are preselected or dynamically selected (e.g., based on an event path).

If the dynamic selection is enabled, the embedded system can determine the event path indicating a respective component of the embedded system involved in the event (operation 356). The event path can indicate the execution of operations associated with the event on hardware components of the embedded system. The vent path can also indicate the sequence of instructions executed on the embedded system in association with the occurrence of the event. Therefore, the event path can indicate both the hardware and software components of the embedded system involved in the event. The embedded system can then identify a respective memory segment associated with the event path to determine the set of memory segments (operation 358). The memory segments can store the states of the components of the embedded system involved in the event.

On the other hand, if the dynamic selection is not enabled, the embedded system can determine a predetermined set of components in the embedded system (operation 360). The set of components can be critical software and hardware components of the embedded system. For example, an application that facilitates the specialized operation of the embedded system can be a critical software component. On the other hand, a DMA unit or a register controller can be a critical hardware component of the embedded system. The embedded system can then identify the memory segment(s) associated with a respective predetermined component to determine the set of memory segments (operation 362). These memory segments can store the state information associated with the predetermined components.

Figure 4:
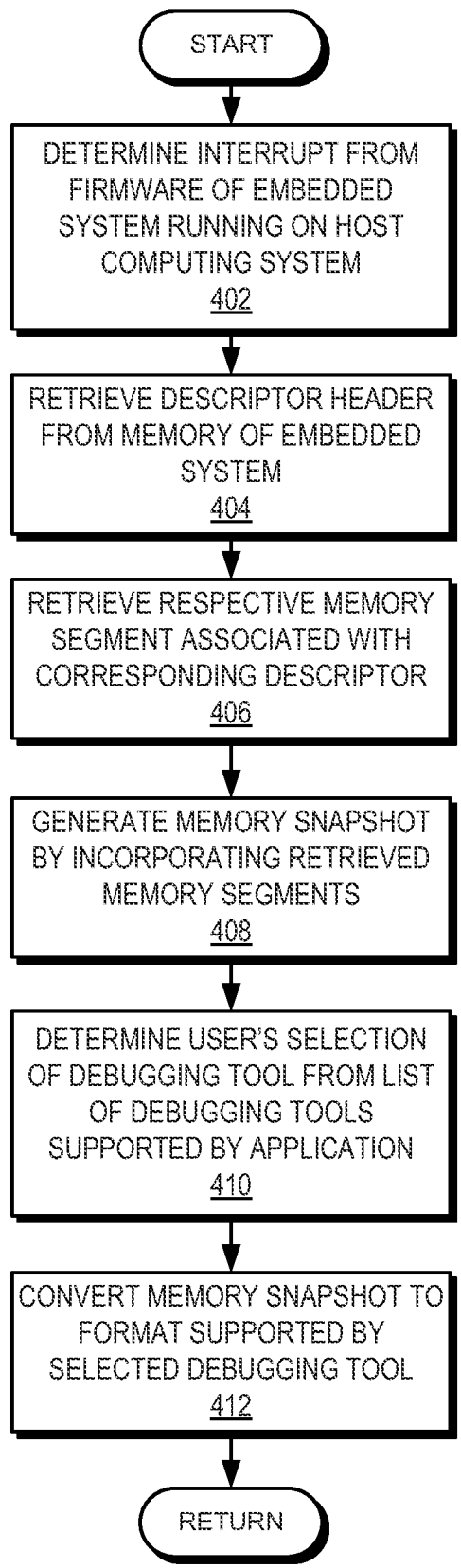
FIG. 4 presents a flowchart illustrating the process of a snapshot management application generating and formatting a memory snapshot, in accordance with an aspect of the present application.

FIG. 4 presents a flowchart illustrating the process of a snapshot management application generating and formatting a memory snapshot, in accordance with an aspect of the present application. During operation, the application can determine an interrupt from the firmware of an embedded system running on a host computing system (operation 402). The application can be an application executing on the operating system of the host computing system. The application can also be a driver of the embedded system. The interrupt can be a hardware interrupt issued to a processor of the host computing system. To detect the interrupt, the application can read a value indicating the interrupt from a register of the processor.

The application can then retrieve a descriptor header from the memory of the embedded system (operation 404). The descriptor header can be placed in a predetermined location of the memory. Furthermore, the fields and respective lengths of the fields of the descriptor header can be predefined and known to the application. Accordingly, the application can read a respective field of the descriptor header from the predetermined location. The descriptor header can indicate the number of descriptors and the length of a descriptor. The application can read the memory and identify a respective descriptor. The application can then retrieve a respective memory segment associated with the corresponding descriptor (operation 406).

The embedded system can then generate the memory snapshot by incorporating the retrieved memory segments (operation 408). The content of a respective memory segment can be included in the memory snapshot. For a respective memory segment, the memory snapshot may also indicate the type and length of the content. The application may also support reformatting of the memory snapshot to a format recognizable by a debugging tool. The application can then determine a user's selection of a debugging tool from a list of debugging tools supported by the application (operation 410). Subsequently, the application can convert the memory snapshot to a format supported by the selected debugging tool (operation 412). For example, if the debugging tool is a GDB tool, the reformatted memory snapshot can be represented by a set of ELF headers. The reformatting can callow the debugging tool to recognize the content of the memory snapshot and present it to a user.

Figure 5:
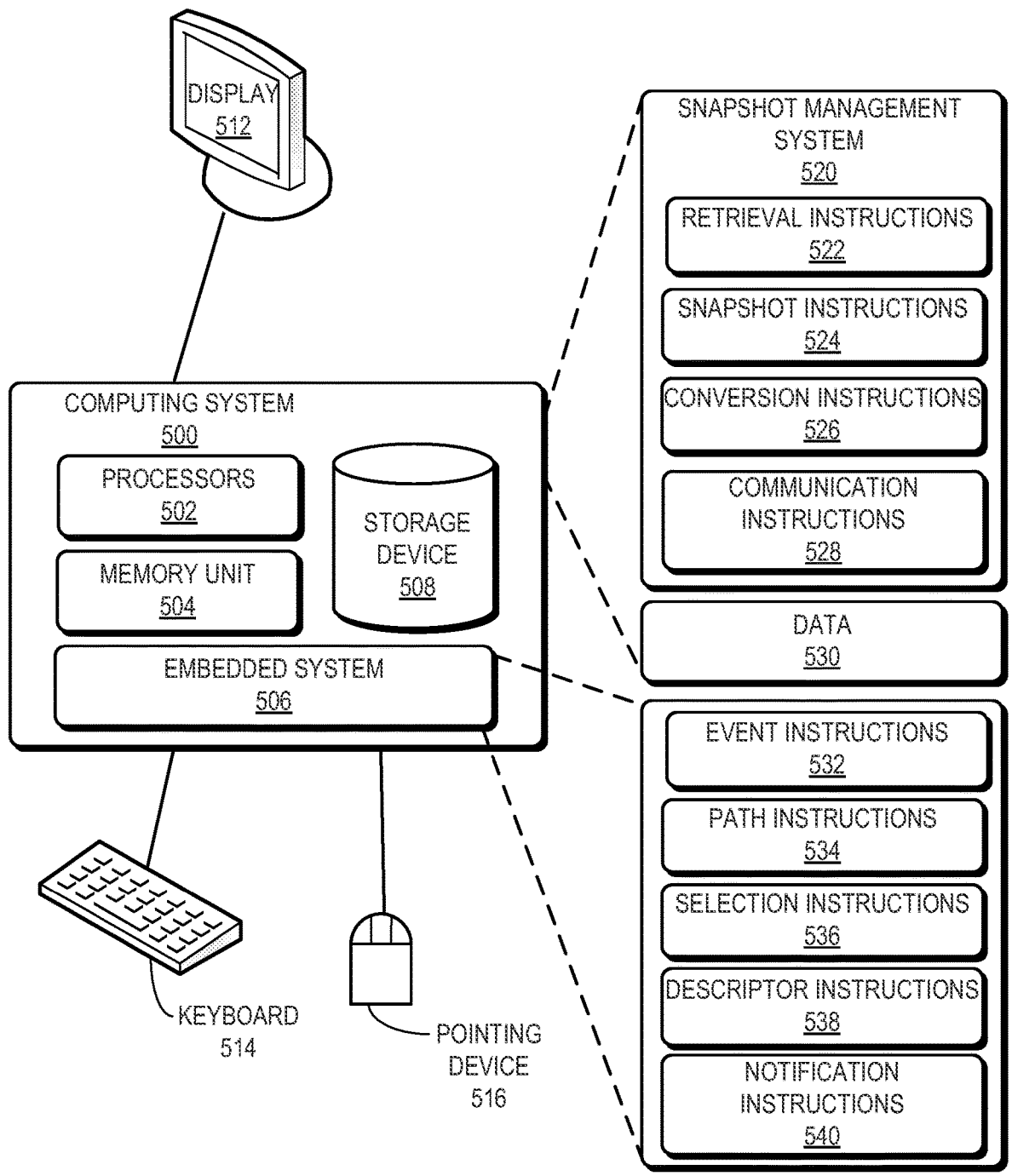
FIG. 5 illustrates an example of a computing system facilitating event-driven memory snapshots, in accordance with an aspect of the present application.

FIG. 5 illustrates an example of a computing system facilitating event-driven memory snapshots, in accordance with an aspect of the present application. A computing system 500 can include a set of processors 502, a memory unit 504, an embedded system 506, and a storage device 508. Memory unit 504 can include a set of volatile memory devices (e.g., dual in-line memory module (DIMM)). Furthermore, computing system 500 may be coupled to a display device 512, a keyboard 514, and a pointing device 516, if needed. Computing system 500 can execute a snapshot management system 520. For example, computing system 500 can execute a snapshot management application that can facilitate snapshot management system 520. Storage device 508 can store data 530 associated with snapshot management system 520.

Snapshot management system 520 can include instructions, which when executed by computing system 500, can cause computing system 500 to perform methods and/or processes described in this disclosure. Similarly, embedded system 506 can include instructions (e.g., a firmware), which when executed by embedded system 506, can cause embedded system 506 to perform methods and/or processes described in this disclosure. Furthermore, data 530 can include any data that can facilitate the operations of snapshot management system 520. Data 530 can include, but is not limited to, memory segments read and retrieved from embedded system 506, a memory snapshot generated from the memory segments, and a datafile generated by reformatting the memory snapshot.

Specifically, embedded system 506 can include instructions for detecting an event (e.g., a failure or an exception) in embedded system 506 (event instructions 532). Embedded system 506 can also include instructions for determining an event path in embedded system 506 (path instructions 534). Furthermore, embedded system 506 can include instructions for selecting a set of memory segments in the memory of embedded system 506 (e.g., based on the event path) (selection instructions 536). Moreover, embedded system 506 can include instructions for placing a descriptor with a respective memory segment (descriptor instructions 538). Embedded system 506 can further include instructions for providing a notification to computing system 500 (e.g., by issuing an interrupt to processors 502) (notification instructions 540).

In addition, snapshot management system 520 can include instructions for retrieving a respective memory block associated with a corresponding descriptor (retrieval instructions 522). Snapshot management system 520 can also include instructions for generating a memory snapshot comprising the memory blocks retrieved from embedded system 506 (snapshot instructions 524). Snapshot management system 520 can further include instructions for converting the memory snapshot into a format recognizable by a debugging tool (conversion instructions 526). Moreover, Snapshot management system 520 can include instructions for sending and receiving packets based on respective destinations (communication instructions 528).

Figure 6:
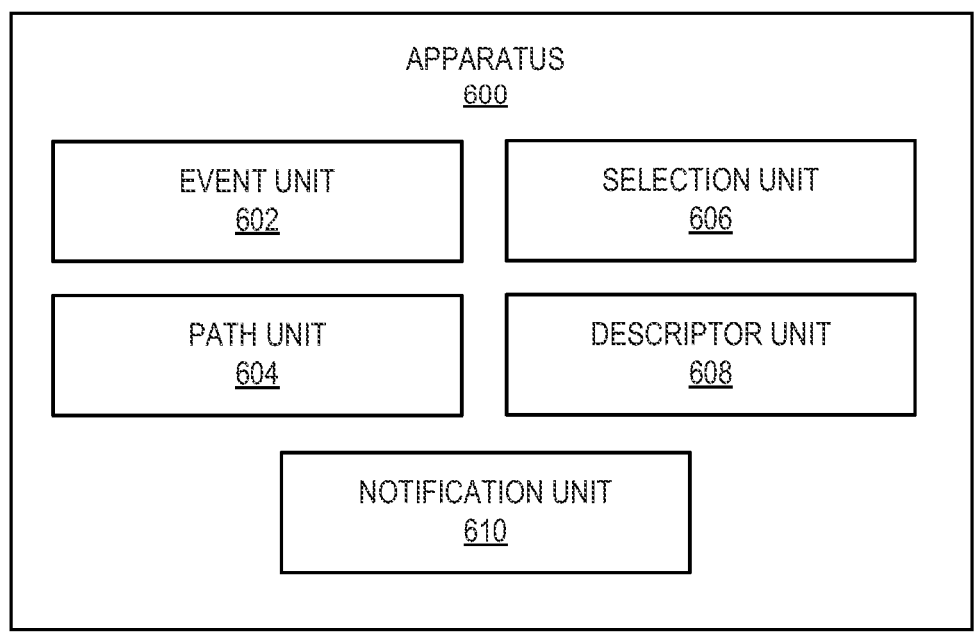
FIG. 6 illustrates an example of an apparatus that facilitates event-driven memory snapshots, in accordance with an aspect of the present application.

FIG. 6 illustrates an example of an apparatus that facilitates event-driven memory snapshots, in accordance with an aspect of the present application. An apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated with a computer system or realized as a specialized device. For example, apparatus 600 can be an embedded system in a computing system. Specifically, apparatus 600 can comprise units 602-610, which perform functions or operations similar to instructions 532-540 of embedded system 506 of FIG. 5, including: an event unit 602; a path unit 604; a selection unit 606; a descriptor unit 608, and a notification unit 610.

The description herein is presented to enable any person skilled in the art to make and use the invention and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown but is to be accorded the widest scope consistent with the claims.

One aspect of the present technology can provide an embedded system in a host computer. During operation, the embedded system can detect an event in the embedded system. Here, the event can trigger the generation of a memory snapshot of the embedded system. The embedded system can then determine a set of memory segments of a memory in the embedded system for inclusion in the memory snapshot. Subsequently, the embedded system can insert a set of descriptors corresponding to the set of memory segments into the memory. Here, a respective descriptor indicates a memory segment associated with a core dump from the embedded system. The embedded system can send a notification to the host computer to generate the memory snapshot comprising the set of memory segments based on the set of descriptors.

In a variation on this aspect, the embedded system can determine an event path associated with the event. The event path can indicate a respective component of the embedded system involved in the event. The embedded system can then identify a respective memory segment associated with the event path to determine the set of memory segments.

In a further variation, the event can be a failure event in the embedded system. Here, the event path can be a crash path of the failure.

In a variation on this aspect, the notification can comprise an interrupt to a processor of the host computer. The interrupt can indicate the event in the embedded system.

In a variation on this aspect, the embedded system can determine a predetermined set of components in the embedded system. The embedded system can then identify a memory segment associated with a respective predetermined component to determine the set of memory segments.

In a variation on this aspect, the descriptor can comprise one or more of: a type of content of a corresponding memory segment and a size of the memory segment.

In a variation on this aspect, the embedded system can insert a descriptor header into the memory. The descriptor header can comprise one or more of: a version number of the firmware of the embedded system, an operating system identifier of the embedded system, an event identifier, a hash digest, a timestamp of the event, a size of the descriptor header, a size of a respective descriptor, a number of descriptors placed in the memory of the embedded system, an architecture code associated with the embedded system, and validity information of the descriptor header.

In a variation on this aspect, the embedded system can convert the memory snapshot to a format supported by a debugging tool.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
    detecting, by an embedded system in a host computer, an event in the embedded system, wherein the event triggers generation of a memory snapshot of the embedded system;
    determining a set of memory segments of a memory in the embedded system for inclusion in the memory snapshot;
    inserting a set of descriptors corresponding to the set of memory segments into the memory, wherein a respective descriptor indicates a memory segment associated with a core dump from the embedded system; and
    sending a notification to the host computer to generate the memory snapshot comprising the set of memory segments based on the set of descriptors.

2. The method of claim 1, further comprising:
    determining an event path associated with the event, wherein the event path indicates a respective component of the embedded system involved in the event; and
    identifying a respective memory segment associated with the event path to determine the set of memory segments.

3. The method of claim 2, wherein the event is a failure event in the embedded system, and wherein the event path is a crash path of the failure.

4. The method of claim 1, wherein the notification comprises an interrupt to a processor of the host computer, and wherein the interrupt indicates the event in the embedded system.

5. The method of claim 1, further comprising:
    determining a predetermined set of components in the embedded system; and
    identifying a memory segment associated with a respective predetermined component to determine the set of memory segments.

6. The method of claim 1, wherein the descriptor comprises one or more of:
    a type of content of a corresponding memory segment; and
    a size of the memory segment.

7. The method of claim 1, further comprising inserting a descriptor header into the memory, wherein the descriptor header comprises one or more of:
    a version number of a firmware of the embedded system;
    an operating system identifier of the embedded system;
    an event identifier;
    a hash digest;
    a timestamp of the event;
    a size of the descriptor header;
    a size of a respective descriptor;
    a number of descriptors placed in the memory of the embedded system;
    an architecture code associated with the embedded system; and
    validity information of the descriptor header.

8. The method of claim 1, further comprising converting the memory snapshot to a format supported by a debugging tool.

9. A computer system, comprising:
    a processing resource;
    an embedded system; and
    a non-transitory computer-readable storage medium storing instructions that when executed by the embedded system cause the embedded system to:
        detect an event in the embedded system, wherein the event triggers generation of a memory snapshot of the embedded system;
        determine a set of memory segments of a memory in the embedded system for inclusion in the memory snapshot;
        insert a set of descriptors corresponding to the set of memory segments into the memory, wherein a respective descriptor indicates a memory segment associated with a core dump from the embedded system; and
        send a notification to the host computer to generate the memory snapshot comprising the set of memory segments based on the set of descriptors.

10. The computer system of claim 9, wherein the instructions when executed by the embedded system cause the embedded system to:
    determine an event path associated with the event, wherein the event path indicates a respective component of the embedded system involved in the event; and
    identify a respective memory segment associated with the event path to determine the set of memory segments.

11. The computer system of claim 10, wherein the event is a failure event in the embedded system, and wherein the event path is a crash path of the failure.

12. The computer system of claim 9, wherein the notification comprises an interrupt to the processing resource, and wherein the interrupt indicates the event in the embedded system.

13. The computer system of claim 9, wherein the instructions when executed by the embedded system cause the embedded system to:
    determining a predetermined set of components in the embedded system; and
    identifying a memory segment associated with a respective predetermined component to determine the set of memory segments.

14. The computer system of claim 9, wherein the descriptor comprises one or more of:
    a type of content of a corresponding memory segment; and
    a size of the memory segment.

15. The computer system of claim 9, further comprising inserting a descriptor header into the memory, wherein the descriptor header comprises one or more of:
    a version number of a firmware of the embedded system;
    an operating system identifier of the embedded system;

an event identifier;
a hash digest;
a timestamp of the event;
a size of the descriptor header;
a size of a respective descriptor;
a number of descriptors placed in the memory of the embedded system;
an architecture code associated with the embedded system; and
validity information of the descriptor header.

16. The computer system of claim 9, wherein the instructions when executed by the embedded system cause the embedded system to convert the memory snapshot to a format supported by a debugging tool.

17. A non-transitory computer-readable storage medium storing instructions that when executed by a processor of a computing device cause the processor to perform a method, the method comprising:
  detecting, by an embedded system in the computing device, an event in the embedded system, wherein the event triggers generation of a memory snapshot of the embedded system;
  determining a set of memory segments of a memory in the embedded system for inclusion in the memory snapshot;
  inserting a set of descriptors corresponding to the set of memory segments into the memory, wherein a respective descriptor indicates a memory segment associated with a core dump from the embedded system; and
  sending a notification to the host computer to generate the memory snapshot comprising the set of memory segments based on the set of descriptors.

18. The non-transitory computer-readable storage medium of claim 17, wherein the method further comprises:
  determining an event path associated with the event, wherein the event path indicates a respective component of the embedded system involved in the event; and
  identifying a respective memory segment associated with the event path to determine the set of memory segments.

19. The non-transitory computer-readable storage medium of claim 17, wherein the method further comprises:
  determining a predetermined set of components in the embedded system; and
  identifying a memory segment associated with a respective predetermined component to determine the set of memory segments.

20. The non-transitory computer-readable storage medium of claim 17, wherein the descriptor comprises one or more of:
  a type of content of a corresponding memory segment; and
  a size of the memory segment.

\* \* \* \* \*